Patented Aug. 25, 1953

2,650,234

UNITED STATES PATENT OFFICE 2,650,234

PHTHALIDE COMPOUNDS AND METHODS FOR THEIR PREPARATION

James H. Boothe, Montvale, N. J., and Samuel Kushner, Nanuet, N. Y., assignors to American Cyanamid Company, New York, N. Y., a corporation of Maine No Drawing. Application June 5, 1952, Serial No. 291,989

12 Claims. (Cl. 260—343.3)

This invention relates to a new class of phthalide compounds and methods of making the same. More particularly this invention relates to a new class of carboxylic acid esters containing a phthalide nucleus.

The new carboxylic acid esters of this invention can be represented by the following formula:

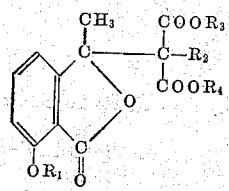

in which $R_1$ represents a lower alkyl radical; $R_2$ represents a member selected from the group consisting of hydrogen, lower alkoxy radicals, lower alkyl radicals, and lower alkyl radicals having a carboxyl ester substituent; and $R_3$ and $R_4$ represent esterified radicals. Illustrative examples of lower alkyl radicals which $R_1$ and $R_2$ may represent are methyl, ethyl and propyl. Examples of lower alkoxy radicals which $R_2$ may represent are methoxy and ethoxy; and an example of a lower alkyl radical having a carboxyl ester substituent, which $R_2$ may represent, is the radical —$CH_2$—COOR in which R represents an esterifying group.

As will be more apparent when the methods of preparing the new compounds are described, the function of the esterifying radicals designated by $R_3$, $R_4$ and R above is to act as blocking groups for the carboxyl radicals, and, therefore, their nature may vary widely. As illustrative examples, these groups may be alkyl radicals, for instance ethyl, methyl, or propyl; or they may be aralkyl radicals, for instance benzyl. Other groups which may be suitably represented by $R_3$, $R_4$ and R will be apparent to those skilled in the art when the methods of preparing the new compounds are described.

The new compounds of this invention are useful intermediates in organic chemistry. For example, the new esters of this invention can be hydrolyzed and decarboxylized according to the procedure of copending U. S. application S. N. 291,990, filed concurrently herewith and then halogenated according to the procedure of copending U. S. application S. N. 286,034, filed May 3, 1952, by Samuel Kushner et al., to produce compounds having fungicidal properties.

While it is not intended that this invention be limited to new compounds of the above description when prepared by any one particular procedure, a method of preparing the new class of compounds has been discovered and it is intended that this new method also constitute a part of the present invention. The new method of this invention comprises contacting, under reactive conditions, a metallo derivative of a selected polycarboxylic acid ester with a 3-methyl-3-halo-7-alkoxyphthalide. This reaction can be more clearly illustrated by the following equation:

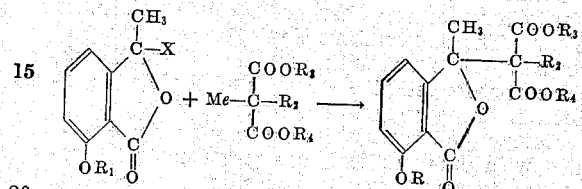

where $R_1$, $R_2$, $R_3$ and $R_4$ are as defined above, X represents halogen and Me represents metal.

The metallo ester derivatives employed in the new reaction of this invention are known compounds prepared by methods well known to those skilled in the art. For instance, when $R_2$ in the above equation represents hydrogen, and Me represents magnesium, the reactant is a magnesio malonic ester and such compounds are well known reagents frequently employed in organic synthesis. Almost any simple ester of the polycarboxylic acid compound is satisfactory since the ester groups are employed solely for the purpose of blocking. Of course, one should not employ esters in which the esterifying radicals are unstable, contain functional groups, or are so large as to possibly result in steric hindrance. Illustrative examples of suitable esters are the benzyl esters, methyl esters, ethyl esters, or esters of the carboxylic acid with any other monohydric alcohol having less than about ten carbon atoms and being free of secondary functional groups. Metallo-carboxylic acid esters of the above formula in which Me represents an alkali metal substituent, for instance magnesium or sodium, are preferred, although derivatives of other metals, for instance the alkaline earth metals, are also satisfactory in most instances.

The 3-methyl-3-halo-7-alkoxyphthalide compounds, employed as starting materials in the above reaction, are prepared by the methods disclosed in copending U. S. application S. N. 286,035, filed May 3, 1952, by Samuel Kushner et al. The 3-methyl-3-chloro-7-alkoxyphthalides are preferred reactants but other halogen substituted compounds, for instance the 3-methyl-3- bromo-7-alkoxyphthalides are also satisfactory.

An inert solvent or diluent is advantageous in the new process of this invention. The preferred inert solvents are the aromatic hydrocarbons, for instance benzene and toluene, although many other common solvents are also quite satisfactory. For instance, one can employ dioxane or petroleum ether as a solvent with quite satisfactory results.

It is an advantage of the new process of this invention that it can be performed over a relatively wide range of temperatures, for instance at temperatures ranging from the freezing point of the reaction mixture to the reflux point of the reaction mixture. The reaction proceeds quite readily at room temperature, but since the reaction velocity is accelerated by heating, temperatures in the range of from about 80° C. to 110° C. are preferred. The reaction proceeds quite rapidly and only a reasonable period of time, for instance fifteen minutes to three hours, need be allowed for a reasonably complete reaction.

The invention will be more particularly illustrated by the following specific examples in which all parts are by weight unless otherwise indicated.

*Example I*

Four parts by weight of 3-methyl-3-chloro-7-methoxyphthalide is added slowly to a solution in dry benzene of the 6 parts by weight of sodiotricarbethoxyethane. The solution is refluxed thirty minutes and then cooled and centrifuged clear. The supernatant liquid is evaporated to dryness, and the resulting residue of 3-methyl-3-(tricarbethoxyethyl)-7-methoxyphthalide is purified by three recrystallizations from ether.

Compounds having the carboxy groups esterified with other radicals are prepared by a procedure identical to the above except that the appropriate ester of the metallo tricarboxylic acid compound is substituted for the ester employed in the above example. For instance, 3-methyl-3-(tricarbomethoxyethyl)-7-methoxyphthalide is prepared by substituting an equal molar quantity of sodiotricarbomethoxyethane for the sodiotricarbethoxyethane employed in the above example.

*Example II*

Four parts by weight of 3-methyl-3-chloro-7-methoxyphthalide are reacted with magnesium malonic ester (from 5.4 parts by volume of malonic ester and 2.65 parts by weight of magnesium methoxide) in 35 parts by volume of dry benzene for three hours. The mixture is then evaporated to dryness, and 25 parts by volume of water, 1.5 parts by volume of concentrated hydrochloric acid, and 25 parts by volume of chloroform added. The chloroform layer is separated, dried, and evaporated to dryness. The resulting residue of 3-methyl-3-(dicarbethoxymethyl)-7-methoxyphthalide is purified by two crystallizations from ethyl acetate followed by recrystallization from ethanol.

Compounds of the above type in which the carboxyl groups are esterified by other esterifying radicals are prepared by a procedure identical to that employed in the above example except that the appropriate malonic ester derivative is substituted for the ester employed in the above example. For instance, 3-methyl-3-(dicarbomethoxymethyl)-7-methoxyphthalide is prepared by the procedure of the above example except that an equal molar quantity of the dimethyl ester of magnesio malonic acid is employed in place of the magnesium malonic ester of the above example.

Other new compounds of this invention are prepared by the same procedures employed in the above examples.

We claim:

1. Compounds selected from the group consisting of carboxylic acid esters represented by the formula:

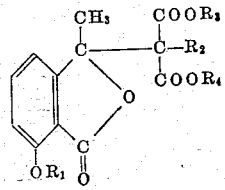

in which $R_1$ represents a lower alkyl radical; $R_2$ represents a member selected from the group consisting of hydrogen, lower alkyl radicals, lower alkoxy radicals and lower alkyl radicals having a carboxyl ester substituent; and $R_3$ and $R_4$ represent esterifying radicals.

2. Compounds represented by the formula:

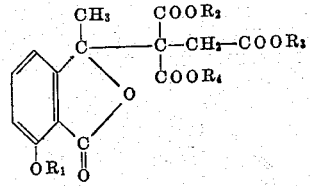

in which $R_1$, $R_2$, $R_3$ and $R_4$ represent lower alkyl radicals.

3. The new compound 3-methyl-3-(tricarbethoxyethyl)-7-methoxyphthalide.

4. The new compound 3-methyl-3-(tricarbomethoxyethyl)-7-methoxyphthalide.

5. Compounds represented by the formula:

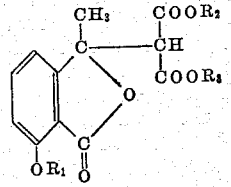

wherein $R_1$, $R_2$ and $R_3$ represent lower alkyl groups.

6. The new compound 3-methyl-3-(dicarbethoxymethyl)-7-methoxyphthalide.

7. The new compound 3-methyl-3-dicarbomethoxymethyl)-7-methoxyphthalide.

8. A method of preparing compounds selected from the group consisting of carboxylic acids represented by the formula:

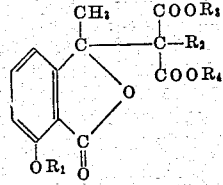

in which $R_1$ represents a lower alkyl radical, $R_2$ represents a member selected from the group consisting of hydrogen, lower alkyl radicals, lower alkoxy radicals and lower alkyl radicals having a carboxyl ester substituent, and $R_3$ and $R_4$ represent esterifying radicals; which comprises contacting, in an inert solvent, a compound represented by the formula:

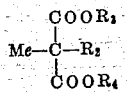

in which Me represents a metal selected from the group consisting of alkali metals and alkaline earth metals, and $R_2$, $R_3$ and $R_4$ are as defined above; with a compound represented by the formula:

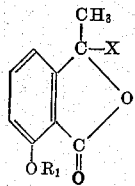

in which X represents halogen and $R_1$ is as defined above.

9. A method of preparing 3-methyl-3-(dicarbethoxymethyl)-7-methoxyphthalide which comprises contacting, in an inert solvent, 3-methyl-3-chloro-7-methoxyphthalide with magnesio-dicarbethoxymethane.

10. The method of preparing 3-methyl-3-(dicarbomethoxymethyl) - 7 - methoxyphthalide which comprises contacting, in an aromatic hydrocarbon solvent, 3-methyl-3-chloro-7-methoxyphthalide with magnesio-dicarbomethoxymethane.

11. The method of preparing 3-methyl-3-(tricarbethoxyethyl) - 7 - methoxyphthalide which comprises contacting, in an aromatic hydrocarbon solvent, 3-methyl-3-chloro - 7 - methoxyphthalide with sodio-tricarbethoxyethane.

12. The method of preparing 3-methyl-3-(tricarbomethoxyethyl)-7-methoxyphthalide which comprises contacting, in an aromatic hydrocarbon solvent, 3-methyl-3-chloro - 7 - methoxyphthalide with magnesio-tricarbomethoxyethane.

JAMES H. BOOTHE.
SAMUEL KUSHNER.

No references cited.